United States Patent
Vander Mey et al.

(10) Patent No.: US 9,113,032 B1
(45) Date of Patent: Aug. 18, 2015

(54) SELECTING PARTICIPANTS IN A VIDEO CONFERENCE

(75) Inventors: Christopher David Vander Mey, Seattle, WA (US); Matthew Newman Shobe, Mercer Island, WA (US); Brian David Marsh, Seattle, WA (US)

(73) Assignee: Google Inc., Mountain View, CA (US)

( * ) Notice: Subject to any disclaimer, the term of this patent is extended or adjusted under 35 U.S.C. 154(b) by 699 days.

(21) Appl. No.: 13/217,849

(22) Filed: Aug. 25, 2011

Related U.S. Application Data (60) Provisional application No. 61/491,796, filed on May 31, 2011.

(51) Int. Cl.
 *G06F 3/00* (2006.01)
 *H04N 7/15* (2006.01)

(52) U.S. Cl.
 CPC ...................................... *H04N 7/15* (2013.01)

(58) Field of Classification Search
 CPC ................................. G06Q 10/10; H04N 7/15
 USPC .................... 715/753; 348/14.08; 379/202.01
 See application file for complete search history.

(56) References Cited

U.S. PATENT DOCUMENTS

| | | | |
|---|---|---|---|
| 7,564,476 B1 * | 7/2009 | Coughlan et al. | 348/14.08 |
| 2005/0018828 A1 | 1/2005 | Nierhaus et al. | |
| 2005/0099492 A1 * | 5/2005 | Orr | 348/14.08 |
| 2007/0011235 A1 * | 1/2007 | Mutikainen et al. | 709/204 |
| 2008/0084984 A1 | 4/2008 | Levy et al. | |

* cited by examiner

*Primary Examiner* — Haoshian Shih
(74) *Attorney, Agent, or Firm* — Remarck Law Group PLC (57) ABSTRACT

In general, this disclosure describes techniques for selecting a subset of participants to display on a display device of a computing device from a plurality of participants in a video conference. In one example, a method includes determining a participation rating for each of a plurality of participants in a video conference, wherein the participation rating is based on one or more conversation properties for each of the two or more participants. The method also includes selecting two or more participants based on the participation rating of each of the two or more participants. The method further includes displaying image data associated with the two or more selected participants on a display device of a computing device.

26 Claims, 4 Drawing Sheets

SELECTING PARTICIPANTS IN A VIDEO CONFERENCE

CLAIM OF PRIORITY

This application relates to and claims the benefit of priority to Provisional Application No. 61/491,796, filed May 31, 2011, which is assigned to the assignee hereof and is hereby expressly incorporated by reference herein.

TECHNICAL FIELD

The disclosure relates to selecting participants in a video conference.

BACKGROUND

Three or more users of computing devices may often engage in real-time video communications, such as video conferencing, where the users (also referred to as participants) exchange live video and audio transmissions.

SUMMARY

Techniques of this disclosure provide a method that includes determining a participation rating for each of a plurality of participants in a real-time visual communication session, wherein the participation rating is based on one or more conversation properties related to the real-time visual communication session and relevant to a desirability for displaying image data associated with a participant for each of the plurality of participants. The method also includes selecting two or more participants from the plurality of participants based on the participation rating of each of the two or more participants. The method further includes providing, for display, image data associated with the two or more selected participants on a display device of a computing device.

Another example of this disclosure provides a computer-readable storage medium comprising instructions for causing a programmable processor to perform operations. The instructions may include determining a participation rating for each of a plurality of participants in a real-time visual communication session, wherein the participation rating is based on one or more conversation properties related to the real-time visual communication session and relevant to a desirability for displaying image data associated with a participant for each of the plurality of participants. The operations may also include selecting two or more participants based on the participation rating of each of the two or more participants and displaying image data associated with the two or more selected participants on a display device of a computing device.

Yet another example provides a computing device that includes one or more processors and a network interface to connect to a video conference having a plurality of participants. The computing device may further include an output device that displays image data. The computing device may also include means for selecting two or more participants from among the plurality of participants for displaying image data associated with the two or more selected participants by the output device.

Techniques of this disclosure provide a method that includes receiving participation data for a plurality of participants engaged in a real-time communication session from a plurality of computing devices associated with the plurality of participants, wherein the participation data is relevant to a desirability for displaying image data associated with the plurality of participants. The method further includes selecting image data associated with two or more participants from the plurality of participants based on the participation data of the each of the two or more participants. The method also includes providing image data associated with the two or more selected participants to a computing device engaged in the real-time communication session.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present invention. Like reference characters denote like elements throughout the figures and text.

DETAILED DESCRIPTION

Techniques of the present disclosure are directed at functionality for determining which participants in a real-time video communication session to display associated image data on a computing device at any given moment during the video conference. In some examples, a real-time video communication session is a video conference. In some video conferencing systems, image data from only one participant is displayed at a time and the software switches between participants based on who is currently speaking. In conversations where many participants are contributing, switching to a current speaker may be disorienting. Additionally, some computing devices such as mobile devices, smart phones, personal data assistants (PDAs), or tablet computers often implement display devices (e.g., presence-sense or touch screens) that have a limited area in which it may be difficult to show video or image data corresponding to every participant in the video conference at the same time. Furthermore, when the number of users or participants is relatively large, it may not be practical to display a video transmission from each participant on the computing device. The present disclosure allows a computing device to display two or more participants simultaneously based on factors related to that participant's activity in the video conference, providing a more seamless approach to video conferencing.

Figure 1:
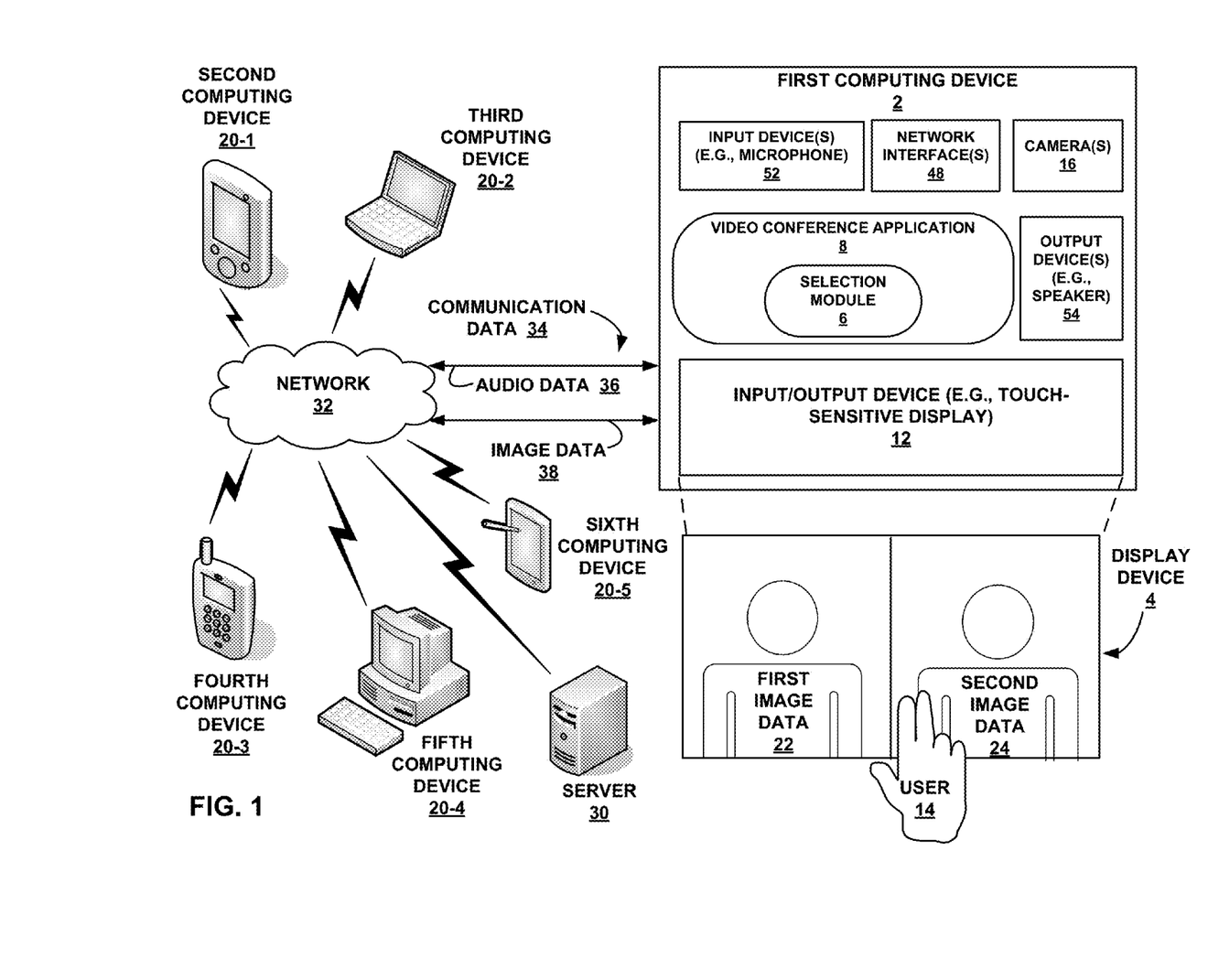
FIG. 1 is a block diagram illustrating an example of a computing device that may execute one or more applications and engage in a video conference with one or more other computing devices, in accordance with one or more aspects of the present disclosure.

FIG. 1 is a block diagram illustrating an example of a first computing device 2 that may execute one or more applications (e.g., video conference application 8) and engage in a video conference with one or more other computing devices 20-1 through 20-5, in accordance with one or more aspects of the present disclosure. As described herein, first computing device 2 may simply be referred to as computing device 2. Computing device 2 may select a set of participants from a plurality of participants in a video conference and display image data associated with the selected set of participants on a display device 4.

Computing device 2 may engage in a video conference with a plurality of other participants using other computing devices. Computing device 2 may connect to one or more other computing devices through network 32. As illustrated in FIG. 1, other computing devices may include second computing device 20-1, third computing device 20-2, fourth computing device 20-3, fifth computing device 20-4, and sixth computing device 20-5. In further examples, different numbers of computing devices 20-1 through 20-5 may be implemented. For illustrative purposes, FIG. 1 is discussed in terms of a currently ongoing video conference between computing device 2 and computing devices 20-1 through 20-5.

Computing device 2 may, in some examples, include or be part of a portable computing device (e.g., a mobile phone, netbook, laptop, personal data assistant (PDA), tablet device, portable gaming device, portable media player, e-book reader, or a watch) as well as non-portable devices (e.g., a desktop computer). For purposes of illustration only, in this disclosure, computing device 2 is described as a portable or mobile device, but aspects of this disclosure should not be considered limited to such devices. Similarly, computing devices 20 may include or be part of a portable computing device as well as non-portable devices. As illustrated, second computing device 20-1 may be a PDA, third computing device 20-2 may be a laptop, fourth computing device 20-3 may be a mobile phone, fifth computing device 20-4 may be a desktop computer, and sixth computing device 20-5 may be a tablet device. Any other numbers and combinations of types of computing devices participating in a video conference according to techniques of this disclosure are contemplated.

Computing device 2 may include an input/output device 12 (e.g., a touch-sensitive device), one or more input devices 52 (e.g., a microphone), one or more cameras 16, and one or more output devices 54 (e.g., a speaker). In some examples, input/output device 12 may comprise display device 4. In some examples, input/output device 12 may only be an output device. For example, input/output device 12 may be a screen without input capabilities. In other examples, display device 4 may be a presence-sensitive screen or a touch screen. In some examples, display device 4 may be capable of receiving touch input from a user 14 (e.g., display device 4 may comprise a touch screen, track pad, track point, or the like). User 14 may interact with input/output device 12, for example, by performing touch input on display device 4. One example of computing device 2 is more fully described in FIG. 2, discussed below.

Computing device 2 may connect to network 32, including a wired or wireless network, via one or more network interfaces 48. Computing device 2 may connect to computing devices 20-1 through 20-5, or to any other number of computing devices. Computing devices 20-1 through 20-5 may be connected to network 32 via wired and/or wireless links. Network 32 may include a wide-area network such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet).

In another example, computing device 2 may connect to a server 30 through one or more network interfaces 48. Computing device 2 and computing devices 20-1 through 20-5 may send data to or receive data from server 30 via network 32. Server 30 may be any of several different types of network devices. For instance, server 30 may be a conventional web server, a specialized media server, a personal computer operating in a peer-to-peer fashion, or another type of network device. In other examples, server 30 may provide conference calling capabilities in accordance with one aspect of this disclosure. For example, server 30 may manage a six-way video conference between computing device 2 and computing devices 20-1 through 20-5.

Computing device 2 may be connected to any of the computing devices 20 in a peer-to-peer fashion, either directly or through network 32. A peer-to-peer connection may be a network connection that partitions tasks or workloads between peers (e.g., first computing device 2 and second computing device 20-1) without centralized coordination by a server (e.g., server 30). Computing device 2 and second computing device 20-1 may exchange communication data 34 via a peer-to-peer connection. In other examples, any combination of computing device 2 and computing devices 20-1 through 20-5 may communicate in a peer-to-peer fashion.

Although the systems and techniques described herein support conferencing capabilities, for illustrative purposes only, FIG. 1 will be described in terms of a real-time video communication between first computing device 2 and second through sixth computing devices 20-1 through 20-5. However, it is to be understood that the techniques and examples described in accordance with this disclosure apply to communications having any number of two or more participants. Also, for illustrative purposes only, this disclosure refers to participants in the sense that there is a single participant (e.g., a person) for each computing device 2 and 20-1 through 20-5. However, it is to be understood that there may be more than one participant for each of computing devices 2, 20-1, 20-2, 20-3, 20-4, and 20-5. In other examples, any of computing devices 2 and 20-1 through 20-5 may be engaged in a video conference without a user.

This disclosure also describes, for illustrative purposes only, each of computing devices 2 and 20-1 through 20-5 as transmitting a single audio or video feed. However, it is to be understood that there may be more than one audio or video feed from each of computing devices 2 and 20-1 through 20-5. For example, more than one user may be using a single computing device, such as, for example, computing device 20-4, to participate in a video conference. In such an example, computing device 20-4 may include more than one input devices 52 (e.g., two microphones and two cameras). In such an example, the techniques described in this disclosure may be applied to the additional audio or video feeds as if they were from separate computing devices.

In FIG. 1, first computing device 2 and computing devices 20-1 through 20-5 have established a real-time video communication, referred to herein as a video conference. A user 14 operates first computing device 2 as a participant in the video conference, and may be interchangeably referred to herein as a participant or as user 14. Similarly, as described herein for illustrative purposes only, five additional participants operate one of computing devices 20-1 through 20-5. As described above, in other examples, different numbers of participants and different numbers of computing devices 20 may be engaged in the real-time video conference.

In one example, first computing device 2 and computing devices 20 exchange communication data 34, which may be streamed real-time. In some examples, communication data 34 may include image data 38 and audio data 36. Image data 38 may be any data that can be visually represented on display device 4. Image data 38 may include one or more still images, a video, a document, a visual presentation, or the like. In one example, image data 38 may be one or more real-time video feeds. As described herein, image data 38 may comprise a plurality of image data signals. In some examples, the image data signals may be associated with a participant. In some examples, each computing device 20-1 through 20-5 communicatively coupled to computing device 2 provides an image data signal as part of image data 38.

In one example, audio data 36 may include audio feeds from the one or more participants. In some examples, audio data 36 may comprise speech of a participant (for example, a participant using fifth computing device 20-4 may be speaking). As described herein, audio data 36 may comprise a plurality of audio data signals. In some examples, the audio data signals may be associated with a participant. In some examples, each computing device 20-1 through 20-5 communicatively coupled to computing device 2 provides an audio data signal as part of audio data 36.

In some examples, image data 38 and audio data 36 may be transferred between first computing device 2 and computing devices 20 over different channels. In other examples, image data 38 and audio data 36 may be transferred over a single channel. In one example, communication data 34 may be transferred using a Real-time Transport Protocol ("RTP") standard developed by the Internet Engineering Task Force ("IETF"). In examples using RTP, image data 38 may have a format such as H.263 or H.264. In other examples, other protocols or formats are used. In other examples, some or all of communication data 34 may be transferred encrypted, such as, for example, using Secure Real-time Transport Protocol (SRTP), or any other encrypted transfer protocol.

In one example, computing device 2 may generate a portion of image data 38 from camera 16 and audio data 36 from input device 52 (e.g., a microphone). In one example, computing device 2 may receive video data from camera 16. In one example, output from camera 16 is provided to one or more of computing devices 20-1 through 20-5, in order that image data associated with user 14 may be displayed on one or more of computing devices 20-1 through 20-5. Image data associated with user 14 may include any image data user 14 wishes to display during the video conference. For example, camera 16 may be pointed approximately at user 14 in order that other participants in the video conference may see an image of user 14. In other examples, user 14 may direct camera 16 elsewhere, for example, at a scene or a document.

In one example, image data 38 and audio data 36 may be associated with each other (e.g., audio data 36 is diegetic to image data 38). In other examples, image data 38 and audio data 36 may not be associated with each other (e.g., audio data 36 is non-diegetic with image data 38, for example, a sound track is played along with image data 38). In some examples, communication data 34 may include both audio data 36 and image data 38; however, in other examples, communication data 34 may include only one of either audio data 36 or image data 38. Further, at any given moment during the real-time video communication, any of computing devices 2 and 20-1 through 20-5 may be sending only audio data 36, only image data 38, or both.

Computing device 2 includes a video conference application 8 that, when executed, provides functionality to computing device 2 to establish and maintain communications between one or more computing devices 20-1 through 20-5. Video conference application 8 may also provide signals to display device 4 to display information related to the video conference communications and to enable user 14 to interact with video conference application 8. In some examples, video conference application 8 may be a "wet" (Watir Extension Toolkit) browser.

Video conference application 8 may include a selection module 6. Selection module 6, in various instances, provides computing device 2 with capabilities to select which image data 38 from which computing devices 20-1 through 20-5 for display on display device 4. For example, display device 4 may display only a subset of image data 38 received by computing device 2. Selection module 6 may assist video conference application 8 in choosing which subset of image data 38 to show on display device 4. In other examples, video conference application 8 contains further communication modules having additional capabilities.

During a video conference, one or more cameras 16 and one or more other input devices 52 of first computing device 2 may be activated. For example, user 14 may point camera 16 at her or his face or another object of interest during video mode in order to transmit a video. In some examples, computing device 2 may switch between different cameras 16, such as a front-facing camera and a rear-facing camera. Input device 38, such as a microphone, may record and sound incident to the microphone, such as a voice of user 14. Computing device 2 may, in real-time, send this video data from camera 16 and audio data from input device 52 to one or more of the computing devices 20-1 through 20-5. In other examples, image data 38 may be sourced from a variety of inputs besides camera 16, such as, for example, a slideshow of pictures, a pre-recorded video feed, a screencast showing a window, or the like. Similarly, audio data 36 may be sourced from any audio source, for example, a sound file stored on one of computing devices 2 or 20-1 through 20-5.

Likewise, one or more of the computing devices 20-1 through 20-5 sends image data 38 and audio data 36 from similar input devices to computing device 2. During a video conference, computing device 2 may output some or all of this received image data 38 and audio data 36, for example, with output devices 54 (e.g., a speaker) and display device 4. In further examples, audio data 36 may not be streamed while image data 38 is streamed. In another example, multiple audio data signals may be streamed by computing device 2.

Display device 4 of computing device 2 may display all or part of image data 38. Video conference application 8 may define a number of image data signals that may be displayed on display device 4 at any given moment during a video conference. As used herein, for illustrative purposes, "displaying a participant" may mean displaying image data associated with that participant or with the computing device the participant is using. For example, as shown in FIG. 1, display device 4 may be configured to display image data associated with two of the six participants.

For example, FIG. 1 shows display device 4 displaying first image data 22 and second image data 24. In one example, first image data 22 and second image data 24 may be included in image data 38. First image data 22 and second image data 24 may be image data associated with any two of the six computing devices 2, 20-1, 20-2, 20-3, 20-4, and 20-5. In one example, first image data 22 comprises image data associated with third computing device 20-2 and second image data 23 comprises image data associated with fourth computing device 20-3. As shown in FIG. 1, display device 4 may display images of two participants from the image data 38.

Additionally, computing device 2 may output all of audio data 36 so user 14 may hear all conference participants, even those participants whose associated image data is not displayed. In other examples, subsets of signals making up audio data 36 are selected for output. In some examples, the sets of audio data signals are selected in accordance with techniques described herein.

Selection module 6 may be invoked by computing device 2 to determine what image data from which participants will be displayed on display device 4. For example, selection module 6 may determine a participation rating for each of the plurality of participants in the video conference. The participation rating may be a rating determined based on one or more conversation properties. Conversation properties may include any factor relevant in determining a desirability level for displaying image data associated with a participant. For example, a conversation property may include an indication that a participant is currently speaking in a video conference. Thus, the participation rating may at least partially be a measure of how active a given participant is in a conversation in the video conference. In another example, a conversation property may include whether user 14 is a friend of another participant. In such an example, the participation rating for a participant may at least partially be a measure of a preference of user 14 for displaying image data associated with the participant. In other examples, the participation rating may be a measure of a combination of these or other conversation properties.

Therefore, in the example of FIG. 1, selection module 6 selects two of the six participants for displaying image data associated with the two selected participants on display device 4 based the participation rating of the participants. For example, selection module 6 may instruct computing device 2 to display image data associated with the two selected participants with the highest participation ratings. In other examples, selection module 6 may select participants based on other qualities of the participation ratings, such as, for example, participants with the highest and the lowest participation ratings, the two lowest participation ratings, the two median participation ratings, or any other determination.

Figure 2:
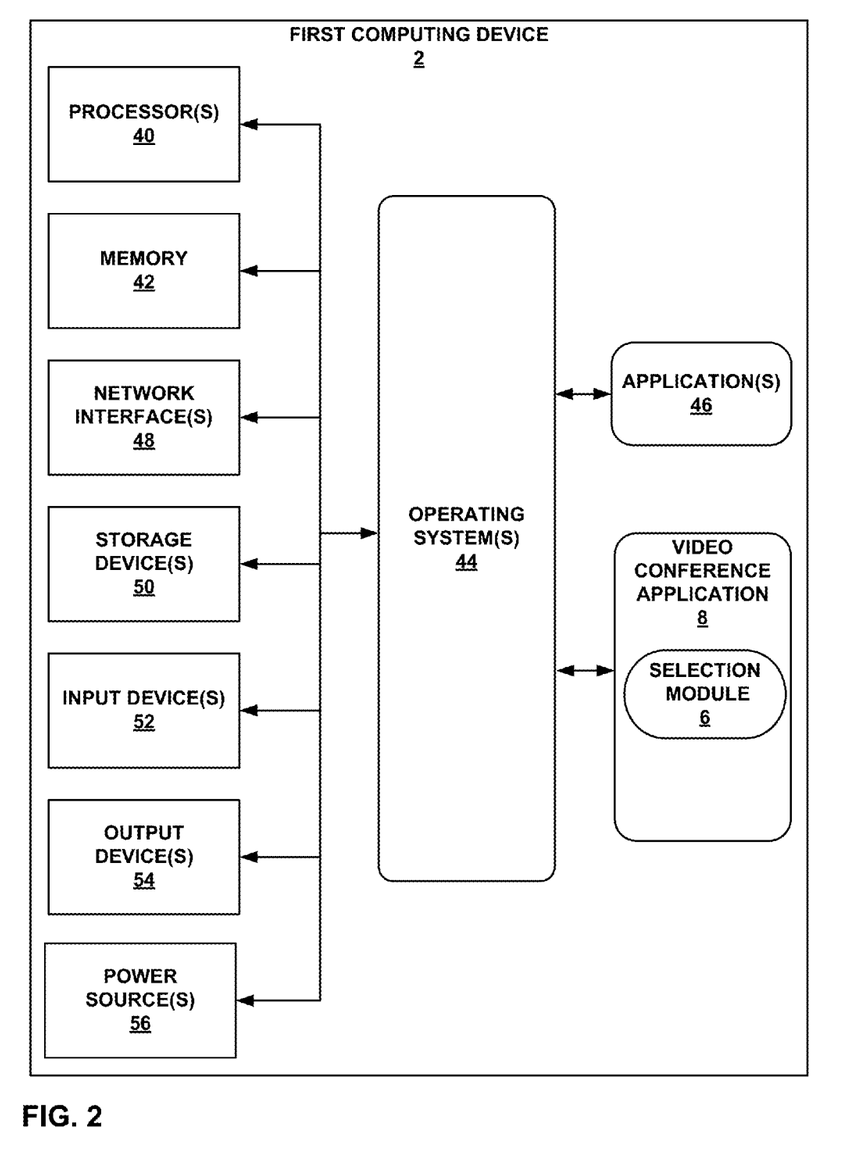
FIG. 2 is a block diagram illustrating further details of one example of computing device shown in FIG. 1, in accordance with one or more aspects of the present disclosure.

FIG. 2 is a block diagram illustrating further details of one example of computing device 2 shown in FIG. 1. FIG. 2 illustrates only one particular example of computing device 2, and many other example embodiments of computing device 2 may be used in other instances. Additionally, one or more computing devices 20-1 through 20-5 may be similar to computing device 2 as shown in FIG. 2.

As shown in the specific example of FIG. 2, computing device 2 includes one or more processors 40, memory 42, one or more network interfaces 48, one or more storage devices 50, one or more input devices 52, one or more output devices 54, and one or more power sources 56. Computing device 2 also includes one or more operating systems 44. Computing device 2 may include one or more applications 46 and video conference application 8. Video conference application 8 may include selection module 6 executable by computing device 2. One or more operating systems 44 may include video conference application 8 or selection module 6 executable by computing device 2. Operating system 44, applications 46 and video conference application 8 are also executable by computing device 2. Each of components 40, 42, 44, 46, 48, 50, 52, 54, 56, 6, and 8 may be interconnected (physically, communicatively, and/or operatively) for inter-component communications.

Processors 40 may be configured to implement functionality and/or process instructions for execution in computing device 2. Processors 40 may be capable of processing instructions stored in memory 42 or instructions stored on storage devices 50.

Memory 42 may be configured to store information within computing device 2 during operation. Memory 42 may, in some examples, be described as tangible or a non-transitory computer-readable storage medium. In some examples, memory 42 is a temporary memory, meaning that a primary purpose of memory 42 is not long-term storage. Memory 42 may also, in some examples, be described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 may be used to store program instructions for execution by processors 40. Memory 42 may be used by software or applications running on computing device 2 (e.g., one or more of applications 46) to temporarily store information during program execution.

Storage devices 50 may also include one or more tangible or non-transitory computer-readable storage media. Storage devices 50 may be configured to store larger amounts of information than memory 42. Storage devices 50 may further be configured for long-term storage of information. In some examples, storage devices 50 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes one or more network interfaces 48. Computing device 2 may utilize one or more network interfaces 48 to communicate with external devices via one or more networks (e.g., network 32 shown in FIG. 1). In one example, one or more network interfaces 48 may correspond to an interface for receiving data from computing devices (e.g., computing devices 20-1 through 20-5 of FIG. 1). In some examples, computing device 2 may include a plurality of either or both input and output interfaces. In some examples, network interfaces 48 may include separate input and output network interfaces of network interfaces 48. In other examples, input and output interfaces may be may be functionally integrated.

One or more network interfaces 48 may include one or more of a network interface card, such as an Ethernet card, configured to communication over, for example, Ethernet, transmission control protocol (TCP), Internet protocol (IP), asynchronous transfer mode (ATM), or other network communication protocols. In other examples, one of network interfaces 48 may be an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 2 may utilize network interface 48 to wirelessly communicate with an external device, such as server 30 or computing devices 20-1 through 20-5, a mobile phone, or other networked computing device.

Computing device 2 may also include one or more input devices 52. Input devices 52 may be configured to receive input, for example, from user 14, through tactile, audio, or video feedback. Examples of input devices 52 may include a touch-sensitive display, a mouse, a keyboard, a voice responsive system, a microphone, video camera 16, or any other type of device for detecting a command from user 14. In one example, one or more input devices 52 may comprise input/output device 12 as shown in FIG. 1. In another example, one or more input devices 52 may comprise display device 4 as shown in FIG. 1.

One or more output devices 54 may also be included in computing device 2, e.g., display device 4. Output devices 54 may be configured to provide output to user 14 using tactile, audio, or video output. Output devices 54 may include a touch-sensitive display, and may utilize a sound card, a video graphics adapter card, or any other type of device for converting a signal into an appropriate form understandable to humans or machines. Additional examples of output devices 54 may include a speaker, a cathode ray tube (CRT) monitor, a liquid crystal display (LCD), or any other type of device that can provide output to user 14. In one example, one or more output devices 54 may comprise input/output device 12 as shown in FIG. 1. In another example, one or more output devices 54 may comprise display device 4 as shown in FIG. 1.

Computing device 2 may include one or power sources 56, which may provide power to computing device 2. The one or more power sources 56 may be one or more batteries, which may be rechargeable. The one or more batteries may be made from nickel-cadmium, lithium-ion, or any other suitable material.

Computing device 2 may include one or more operating systems 44. One or more operating system 44 may control the operation of components of computing device 2. For example, operating systems 44 may facilitate the interaction of application 46 or video conference application 8 with processors 40, memory 42, network interfaces 48, storage devices 50, input devices 52, output devices 54, and batteries 56.

Video conference application 8 may additionally include selection module 6, which may be executed as part of operating system 44. In other cases, selection module 6 may be implemented or executed by computing device 2. Selection module 6 may process video data, e.g., image data 38 received from one or more of computing devices 20-1 through 20-5. Selection module 6 may select a subset of participants from a plurality of participants in a video conference, wherein selection module 6 or video conference application 8 provides signals to instruct display device 4 to display image data associated with the selected set of participants. Additionally, selection module 6 may receive input from a component such as processors 40, memory 42, one or more network interfaces 48, one or more storage devices 50, one or more output devices 54, one or more batteries 56, or operating system 44. In some cases, selection module 6 may perform additional processing on communication data 34. In other cases, selection module 6 may transmit input to an application, e.g. applications 46, or other component in computing device 2.

Any applications, e.g. applications 46 or video conference application 8, implemented within or executed by computing device 2 may be implemented or contained within, operable by, executed by, and/or be operatively/communicatively coupled to components of computing device 2, e.g., one or more processors 40, memory 42, one or more network interfaces 48, and/or storage devices 50.

Figure 3:
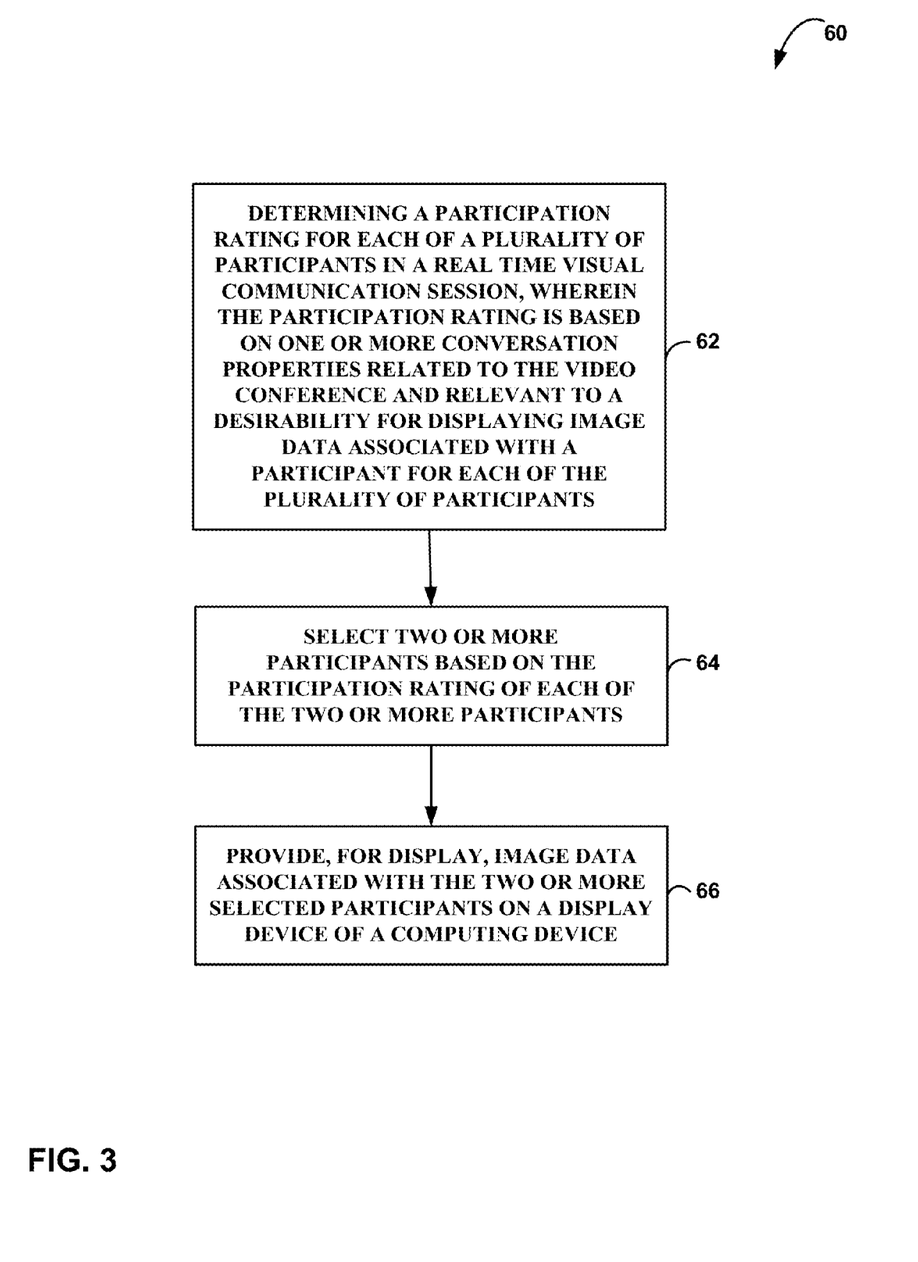
FIG. 3 is a flow chart illustrating an example method that may be performed by a computing device to determine which image data associated with two or more participants from a plurality of participants in a video conference to display on the computing device, in accordance with one or more aspects of the present disclosure.

FIG. 3 is a flow chart illustrating an example method 60 that may be performed by a computing device to determine which image data associated with two or more participants from a plurality of participants in a real-time communication session to display on the computing device, in accordance with one or more aspects of the present disclosure. A real-time communication session may be a video conference or other visual communication session. Method 60 may further determine which image data associated with two or more participants of a plurality of real-time communication session participants to display on the computing device. For example, method 60 may be performed by computing devices 2, 20-1, 20-2, 20-3, 20-4, or 20-5 as shown in FIG. 1 or 2.

Method 60 may include determining a participation rating for each of a plurality of participants in a video conference, wherein the participation rating is based on one or more conversation properties related to the real-time communication session and relevant to a desirability for displaying image data associated with a participant for each of the plurality of participants (62). A desirability for displaying image data associated with a participant may be associated with a level of participation of the participant. A participation rating may be a rating, a score, or a ranking. In one example, method 60 determines a participation rating for each participant or computing device engaged in a real-time communication session. In another example, method 60 determines a participation rating for each separate image data signal received by the computing device that is performing method 60 (e.g., computing device 2).

Conversation properties may include factors relevant in determining a desirability level for displaying image data associated with a participant during a video conference. Conversation properties may further include qualities that can quantify participation of a participant in the video conference. Values may be assigned to some or all of the conversation properties. In some examples, determining a participation rating may include totaling the values of the one or more conversation properties. In another example, determining a participation rating may include averaging the values of the conversation properties. Further, a participation rating may be a weighted average of conversation properties. Selection module 6 may assign different, or approximately the same, weights to different conversation properties.

In one example, a participation rating for a participant may be increased when one or more of the one or more conversation properties indicate the participant is more actively participating than that participant previously was in the video conference. For example, active participation may include speaking or perform a function for the video conference (such as, for example, mediating or presenting). Likewise, the participation rating for the participant may be decreased when one or more of the one or more conversation properties indicate the participant is less actively participating than the participant previously was in the video conference. For example, a less actively participating participant may be one who is listening or watching the video conference with minimal contribution. In one example, being an active participant may indicate that the participant is involved with the process of the video conference or otherwise contributing to it. In contrast, a non-active participant may be a passive listener or watcher of the video conference. As used herein, a "positive participation rating" refers to a rating which makes a participant more likely to be selected, and is not necessarily directed to any mathematical property of the rating.

One example conversation property may include whether a participant is currently speaking at a particular moment during the video conference. When a participant is speaking, selection module 6 may indicate the presence of this property, or assign a value (such as a positive value) to the property. In one example, any currently speaking participant may be given a highest rating or ranking of the plurality of participants. In another example, a weight may be assigned to the conversation property. In one example, a participation rating is increased when a participant begins speaking, and decreases when the participant ceases speaking. In some examples, a most recently used (MRU) algorithm may be used by selection module 6.

Another example conversation property may be a designation or determination that a participant has a particular status in the video conference. For example, a participant may be an organizer, leader, or moderator of the video conference. In one example, a participant who called the meeting may be given a higher participation rating than that participant would otherwise receive. In another example, a moderator may be given a high participation rating in order that participants may be able to see the moderator at most or all times during the video conference. In another example, another type of status may be used as a conversation property.

Further conversation properties may include considerations of how often a participant has spoken. For example, a conversation property may include a duration a participant has spoken. In one example, the duration is a measure of how long a participant has been speaking since the participant began speaking. In another example, the duration a participant has spoken may be measured from the beginning of the conference call. A value assigned to the duration of speaking conversation property may increase with increasing amount of time the participant spoke. A positive correlation between the value of the conversation property and length of time speaking may be based on any mathematical relationship, including a linear or logarithmic relationship. Likewise, a value of any other conversation property may have a mathematical relationship to what the conversation property is measuring, if appropriate.

Similarly, another conversation property may include a duration since a participant has last spoken. In such an example, the participation rating for a participant who is no longer speaking may decrease correspondingly with the duration since the participant last spoke. In another example, a participation rating may decrease for a participant who was previously speaking only when the participant has not spoken for a threshold duration (for example, after a minute of not speaking).

Another conversation property may include a determination of a ratio of the duration the participant has spoken to a total duration of the video conference. In one example, the more a participant speaks, the more likely other participants want image data associated with that participant displayed on their computing devices. Thus, the participation rating of a participant may increase with increasing percentage of time that the participant has spoken during the video conference.

Yet another conversation property may include a relationship between a participant associated with one or more of the other participants. A relationship may be based on a social media status between the two or more participants. For example, if a first participant has a "friend" or "like" status with a second participant in a social media, both the first and second participants may have an increased participation rating for each other. In another example, only those participants who are a friend of the determining participant (that is, the user of the particular computing device that is making the determination) may be given a positive rating. Each participant's computing device 2 may display a different set of other participants based on their individual social graph or profile, that is, their individual set of friends.

In another example, a conversation property may include whether a participant has spoken the name of another participant. For example, computing device 2 may comprise speech recognition capabilities, which may be part of selection module 6. As audio data 36 may include speech, computing device 2 may detect words spoken by a participant. In one example, computing device 2 may detect when a participant is speaking directly to another participant. In such an example, if computing device 2 detects a spoken name or other identifier associated with a participant, selection module 6 increases the participation rating of that participant. This increase may be removed or otherwise lessened with time. The identifier associated with a participant may be a name, a username, a login name, a role the participant is playing in the video conference (such as mediator or presenter, etc.), or the like. Potential identifiers may be stored in a database accessible by computing device 2 (e.g., in storage device 50). These potential identifiers may be linked with one or more participants.

Quality of image data from a computing device may also be a conversation property. In one example, a video quality conversation property is assigned a value based on a quality of the image data associated with a participant. For example, user 14 may not wish to display image data from a participant that is of poor quality. In one example, a participant may be entirely removed from consideration when a quality of the image data associated with the participant is below a threshold quality level. In such an example, the computing device may still output audio data from a participant whose image data is not displayed. Likewise, a relatively good video quality may be assigned a higher rating than a relatively poor video quality. In other examples, a relatively high video quality may be assigned a lower participation rating. For example, a computing device with limited processing power may not want to display relatively high resolution video data.

Another conversation property may be whether a participant is displaying or presenting a conference resource. Examples of conference resources may include using a whiteboard program, presenting a PowerPoint™ or other presentation, using Google Documents™, sharing a screen, or the like. In some examples, a conference resource may be displayed on a display device, as shown below with respect to FIG. 4. In other examples, a conference resource may be displayed upon detection of an identifier of the conference resource (for example, a participant speaks a name of the conference resource).

Another conversation property may be based on email threads between a user and another participant. For example, if the user and a participant have recently emailed each other, the participation rating for the participant may increase. The video conference application, for example, video conference application 8, may receive data from one or more email accounts associated with the video conference application. The data may include information related to whether the user has emailed any of the participants in the video conference. In addition, the video conference application may have access to the bodies of emails between participants in a video conference. A participation rating of a participant may be altered based on an email between the participant and the user. The participation rating may increase for a participant when an email is sent between the participant and the user during the video conference.

In another example, if user 14 has muted or otherwise blocked a participant, the participation rating for that participant may decrease. If user 14 un-mutes or no longer blocks the participant, the participation rating of the participant may increase. In another example, a participation rating for a participant who speaks in relatively quick bursts may be lowered. This may be done in order to reduce a potential for rapid switching between participants based on which participant is currently speaking. Likewise, in some examples, a time delay may be passed before a newly selected participant may replace a previously selected participant. This delay period may be added in order to reduce a probability of rapid switching. For example, if a participation rating for newly selected participant decreases such that the newly selected participant would no longer be selected within the delay period, image data associated with the newly selected participant may not be displayed. In other examples, other conversation properties are used to reduce the occurrence of rapid switching.

Similarly, another conversation property may include a detection of a participant otherwise catching the attention of another participant, such as, by changing an image captured by a video camera, such as camera 16. In another example, a conversation property may include detecting, via camera 16, a movement by the participant. For example, a participant may perform a gesture, such as waving a hand, in order to get the attention of other participants in the video conference.

Yet another conversation property may include whether a participant has been selected by one or more other participants. For example, user 14 may select a participant in order to have image data associated with the participant displayed on computing device 2. User 14 may select the participant from a list of the participants. In one example, user 14 touches a graphical representation of the image data associated with the participant on display device 4, wherein display device 4 comprises a touch screen in order to select the participant.

Further conversation properties may include a viewing mode the computing device is operating in (e.g., a full screen mode). Another conversation property may include whether a participant is presenting or sharing a screen, or attempting to present or share the screen. Also, if a first participant is a direct report for a second participant (for example, they have a supervising or employment relationship), the second participant may replace the first participant when the second participant speaks. Furthermore, information from other applications, such as a calendar application, may be used by selection module 6 to determine some of the conversation properties.

Another conversation property may include which participants are viewing a shared resource. For example, the conference application may include the ability for users to optionally share a resource, such as watching a video together. Participants may be selected based on which participants are watching the video. A participant may receive a higher participation rating for a user who is watching a video if the participant has opted in to also watch the video. For example, not all participants of the conference may elect to watch the video, and only those participants watching the video may be displayed on the computing device associated with the user.

In some instances, some participants in a video conference may have additional communications between a subset of the participants in the video conference. For example, some participants in a video conference may also be engaging in a private or group text chat. Another conversation property may include whether a user is engaging in additional communications with another participant. If so, the participant may receive a higher participation rating for the user because of the additional communication. For example, a user is text chatting with a participant in the video conference, so the participant is displayed on the computing device used by the user. Further, the display of participants may be organized based on which participants the user may be chatting with. For example, in a video conference, participants who the user is chatting with may be displayed with a larger image than those participants the user is not chatting with.

Participation ratings may be determined individually for each participant. That is, for each user, the participation ratings for that participant and all other participants may be determined independently of other users' participation ratings. These separate determinations may be based on particular aspects of the relationship between the determining participant and the other participants in the video conference. Such relationships may include factors such as whether the determining participant is friends with the other participants, the presence of an employment or familial relationship, whether the determining participant has blocked a participant, etc. This enables different users of computing devices, such as computing devices 2 and 20-1 through 20-5, to see different sets of the plurality of participants as compared with other users or participants. In another example, participation ratings for each participant may be the same among all users (e.g., among all the participants). In other examples, some determining participants may share, or have some of the same, participation ratings.

Participation ratings may be determined based on an algorithm. In some examples, the algorithm may be weighted such that some conversation properties are weighted more than others. For example, a participation rating may be determined by adding together values assigned to conversation properties. The values of the conversation properties may be multiplied by coefficients.

For example, a participation rating for a participant may be based on whether the user is friends with the participant (e.g., like_factor), a ratio of how often the participant is speaking, and a ratio of how many times the participant has edited shared documents over the total number of edits to the shared documents. Such an equation to determine the participation rating may be shown in Equation 1:

$$\text{Participation rating} = A(\text{like\_factor}) + B(\text{number of minutes speaking/total minutes of conference}) + C(\text{number of edits/total number of edits}) \quad (1)$$

As shown in Equation 1, A, B, and C are coefficients used to weigh the different factors. The values of the coefficients may be different for different users and may be based on how important a particular conversation factor is to the user. Also, one user may have different coefficients for different participants. Equation 1 is an example equation showing three conversation properties. However, participation ratings may also include additional factors based on other conversation properties.

As shown in FIG. 3, method 60 may further include selecting two or more participants from the plurality of participants based on the participation rating of each of the two or more participants (64). In one example, the number of participants that are selected may be based on properties of the computing device. Such properties include, but are not limited to, screen size, processing capabilities, network connection quality or speed, and the like. In other examples, the selection is made individually for each computing device. A computing device may display N number of image data signals associated with participants, where N is an integer. For example, N for a desktop computer may be larger than N for a mobile phone. In other examples, N may be dynamically determined throughout the video conference based on properties of the video conference (for example, how many total participants the video conference has, how many active participants there are, etc.).

In some examples, participants may not want themselves to be selected because they may not want to see their own image. For example, user 14 using computing device 2, may not wish to have image data from camera 16 displayed on display device 4. In other words, a participant may be removed from consideration for selection when that participant is using the particular computing device. In some examples, a small thumbnail of the image data from camera 16 is displayed on display device 4, for example, in an overlay.

Participants may be selected based on comparing their participation ratings. For example, if a display device can display N number of image data signals, N participants with the top, or highest, participation ratings are chosen. In other examples, other metrics are used for selecting among the participants based on their participation ratings.

In some examples, a specific quality or presence of a particular conversation property for a participant may automatically result in selection of the image data associated with that participant. For example, a participant who is currently speaking may always be selected for displaying the image data associated with that participant. As another example, the presence of a conversation property, such as a designation of status, may be used to select a participant with that status (e.g., meeting organizer, mediator, or presenter). In another example, only those participants who are friends with the determining participant are selected. In a further example, a participant may be selected as one of the two or more selected participants responsive to detecting an identifier associated with that participant.

If two or more participants have the same participation rating, and image data associated with both participants cannot be displayed on a computing device, one participant may be selected based on another factor. In one example, a random participant among the tied participants may be chosen. In another example, the presence or absence of a selected conversation property may trump an otherwise tied participation rating. For example, a currently speaking participant may be selected over another participant with the same participation rating. In other examples, other methods of tie breaking are employed for selecting participants.

As a video conference progresses, each participation rating for each of the plurality of participants may be updated throughout the video conference. In one example, the participation ratings are continuously updated. In other examples, the participation ratings are updated intermittently or at regular intervals. Likewise, the selection process may also be performed regularly, intermittently, or continuously throughout the video conference. In some examples, the selection process may be performed each time the participation ratings are updated.

Method 60 may also include displaying image data associated with the two or more selected participants on a display device of a computing device (66). The number of displayed image data signals may be determined by specific properties of the computing device. As shown in FIG. 1, two participants are selected, and two sets of image data signals are displayed on display device 4. Other numbers of participants may be selected and image data associated with them displayed.

In other examples, participants may be selected in order to determine how image data associated with the participants will be displayed. For example, participants may be selected to be displayed having a larger displayed image than non-selected participants. For example, all the participants may be displayed on the computing device at least as thumbnail images, while selected participants are displayed with larger images. In other examples, participants may be selected in order to display image data associated with the selected participants in a certain position or orientation. In further examples, participants may be selected in order to display image data associated with the selected participants having brightness different from image data associated non-selected participants. In other examples, the display of image data associated selected participants may differ from the display of image data associated non-selected participants in other ways, including color, duration of display, or the like.

Method 60 may further include replacing the image data associated with one of the selected participants with image data associated with a newly selected participant when a participation rating for the newly selected participant exceeds a participation rating for the one of the selected participants. Likewise, even if the participation rating for the newly selected participant does not exceed the participation rating for the previously selected participant, image data associated with the new participant may replace image data associated with a previously selected participant.

In another example, image data associated with a participant who is currently speaking may be displayed in a graphical location of the display device designated for a current speaker, unless the participant who is currently speaking is one of the one or more selected participants.

A participant may be notified if image data associated with him or her is selected for one or more other participants. In another example, an indication is provided to each participant of what their participation rating is, which may be an average of participation ratings for that participant among all the users.

In another example, a method for selecting image data for two or more participants engaged in a real-time communication session may include receiving participation data for a plurality of participants engaged in a real-time communication session from a plurality of computing devices associated with the plurality of participants. A server, such as server 30 of FIG. 1, may receive the participation data for a plurality of participants. The server may host the real-time communication session between the plurality of participants.

The participation data may be relevant to a desirability for displaying image data associated with the plurality of participants. Image data associated with two or more participants from the plurality of participants is selected based on the participation data of the each of the two or more participants. The image data associated with the two or more selected participants may be provided to a computing device engaged in the real-time communication session.

Figure 4:
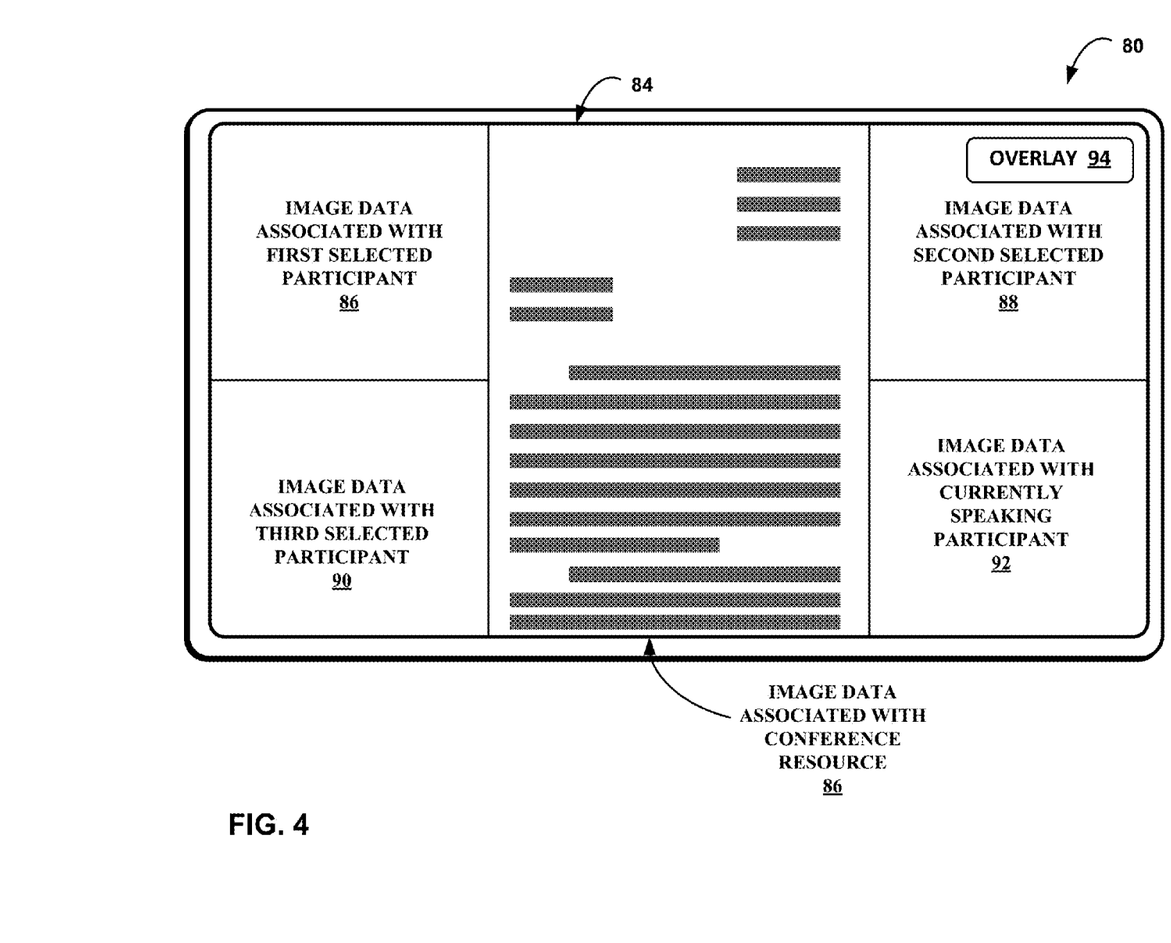
FIG. 4 is a block diagram illustrating one example of a computing device configured to display image data associated with a conference resource and a set of plurality of participants in a video conference, in accordance with one or more aspects of the present disclosure.

FIG. 4 is a block diagram illustrating one example of a computing device 80 configured to centrally display image data associated with a conference resource and a set of plurality of participants in a video conference, in accordance with one or more aspects of the present disclosure. Computing device 80 may be similar to computing device 2 of FIG. 1.

Computing device 80 may comprise a display device 84. As shown in FIG. 4, display device 84 may be virtually partitioned into five sections. Display device 84 may display image data associated with four participants of a video conference. For example, display device 84 displays image data associated with a first selected participant 86, image data associated with a second selected participant 88, image data associated with a third selected participant 90, and image data associated with a currently speaking participant 92. Display device 84 may also display image data associated with a conference resource 86. As illustrated in FIG. 4, the conference resource may be a document. However, in other examples, the conference resource may be another type of resource, including, for example, a presentation, a video, text, or the like.

The participants may be selected according to any of the techniques described herein. For example, the first through third selected participants may have the top three participation ratings. In one example, if the currently speaking participant is not one of the three selected participants, the currently speaking participant may be displayed in a designated graphical portion of the display device 84. If one of the three selected participants begins speaking, image data associated with the previously speaking participant may remain displayed in the designated graphical portion.

As shown in FIG. 4, a conference resource may be centrally displayed, while the two or more selected participants are displayed surrounding the image data associated with the conference resource 86. That is, image data associated with a conference resource 86 may be displayed in a central graphical location of display device 84, wherein the image data associated with the two or more selected participants is displayed approximately around image data associated with the conference resource 86. In one example, image data associated with the conference resource 86 is displayed larger, or with higher resolution, than image data associated with the selected participants.

In addition to displaying image data, display device 84 may further display an overlay 94. Overlay 94 may be an image having any shape, size, coloration, or style that is overlaid on top of at least a portion of the image data. Information that may be included in overlay 94 may include a list of participants, a thumbnail of image data computing device 80 is outputting (such as, for example, a video feed from camera 16), or provide interactive options available to a user during a video conference. Such options may include, for example, functionality to close the application, adjust brightness of volume, select a number of participants to be selected, select a particular participant, set how often the participation ratings are updated, or the like. Any of the techniques and features described herein may be user configurable in some examples.

Techniques and systems of the present disclosure may allow a computing device to calculate a participation rating for each of a plurality of participants in a video conference, wherein the participation rating is based on one or more conversation properties. Two or more participants may be selected based on the participation rating for display on a display device of the computing device.

As described herein, there are many conversation properties that may potentially influence a participation rating of a participant. A participation rating may increase for a participant who is currently speaking, who is the meeting organizer, who is currently presenting a conference resource, relatively good video quality, for those who have "friend" or "like" status in a social media with another participant, or for any other quality. In contrast, a participation rating may decrease for a participant who has not spoken for a time, if another participant has muted or otherwise blocked the participant, has relatively poor video quality, or if the participant speaks for relatively short times. In another example, when the computing device recognizes that a participant said a second participant's name or username, the second participant is automatically displayed or their rating is increased.

According to one example, the three highest rated participants are displayed on the display device. In an alternative example, the three highest rated participants are displayed along with the currently speaking participant if the currently speaking participant is not one of the highest rated participants. In another example, four of the highest rated participants are displayed. In some examples, the conversation rating is determined based on a weighted average of two or more conversation properties. In another example, a conference resource may be displayed in addition to the selected participants. In one example, a conference resource may be centrally displayed, while the two or more selected participants are displayed surrounding the conference resource.

The functionality of this disclosure may be applied differently for each computing device used in the video conference. For example, a greater number of selected participants may be displayed for a participant using a personal computer than for a participant using a smart phone.

Techniques of the present disclosure may provide an improved user experience during video conferences. A set of participants may be displayed in a size appropriate for the user to see the relevant information. The techniques allow a user to see those people who are part of a conversation in the video conference. Participants who are relevant to the conversation at any particular time are brought up to be displayed, while participants who become less relevant to the conversation are dropped off. In this way, techniques of the disclosure dynamically create a group of panelists, which may be the same or different for each user.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise a tangible or non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

The invention claimed is:

1. A method, comprising:
    determining, at a computing device that includes one or more processors and that is associated with a user, a participation rating for each of a plurality of participants in a real-time visual communication session, wherein the participation rating is based on one or more conversation properties related to the real-time visual communication session and relevant to a desirability for displaying image data associated with a participant for each of the plurality of participants, and wherein the participation rating for each particular participant is determined independently of (i) other users' participation ratings for the particular participant, and (ii) a manual input of the user during the real-time visual communication session;
    selecting, at the computing device, two or more participants from the plurality of participants based on the participation rating of each of the two or more participants; and
    providing, for display, image data associated with the two or more selected participants on a display device of the computing device.

2. The method of claim 1, further comprising:
    updating the participation rating for each of the plurality of participants throughout the real-time visual communication session; and
    selecting the two or more participants based on the updated participation rating for each of the plurality of participants.

3. The method of claim 1, further comprising:
    replacing the image data associated with one of the selected participants with image data associated with a newly selected participant when a participation rating for the newly selected participant exceeds a participation rating for the one of the selected participants.

4. The method of claim 1, wherein the plurality of participants includes an organizer of the video conference, and
    wherein determining the participation rating for each of the plurality of participants further comprises determining the participation rating for the organizer such that the organizer is selected as one of the two or more selected participants.

5. The method of claim 1, wherein determining the participation rating for each of the plurality of participants further comprises:
    increasing the participation rating for a participant when one of the one or more conversation properties for the participant indicates the participant is more actively participating in the real-time visual communication session; and
    decreasing the participation rating for the participant when one of the one or more conversation properties for the participant indicates the participant is less actively participating in the real-time visual communication session.

6. The method of claim 1, wherein the one or more conversation properties comprise a duration a participant has been speaking since the participant began speaking.

7. The method of claim 6, wherein determining the participation rating for each of the plurality of participants further comprises determining a ratio of the duration the participant has spoken and a total duration of the real-time visual communication session.

8. The method of claim 1, wherein the one or more conversation properties comprises at least one of an indication that a participant is currently speaking and an indication of a selection of a participant by a user of the computing device.

9. The method of claim 1, wherein the one or more conversation properties comprise a duration since a participant last spoke, and wherein the participation rating for the participant decreases correspondingly with the duration since the participant last spoke.

10. The method of claim 1, wherein the one or more conversation properties comprise a relationship of a participant associated with a user of the computing device.

11. The method of claim 1, wherein the one or more conversation properties comprise a quality of image data, and wherein selecting the two or more participants further comprises removing a participant from consideration of selection when a quality of image data associated with the participant is below a threshold quality level.

12. The method of claim 1, further comprising:
    detecting an identifier associated with a participant of the plurality of participants; and
    responsive to detecting the identifier, selecting the participant as one of the two or more selected participants.

13. The method of claim 1, wherein determining the participation rating for each of a plurality of participants is further based on determining a weighted average of the one or more conversation properties.

14. The method of claim 1, further comprising:
    displaying image data associated with a participant who is currently speaking in a graphical location of the display device designated for a current speaker, unless the participant who is currently speaking is one of the two or more selected participants.

15. The method of claim 1, wherein selecting the two or more participants further comprises removing a participant from consideration for selection when the participant is a user of the computing device.

16. The method of claim 1, further comprising:
    displaying image data associated with a conference resource on the display device of the computing device.

17. The method of claim 16, wherein displaying the image data associated with the conference resource further comprises displaying the conference resource in a central graphical location of the display device, wherein the image data associated with the two or more selected participants is displayed approximately around the image data associated with the conference resource.

18. The method of claim 1, further comprising:
    determining a number of the one or more selected participants based on properties of the computing device.

19. The method of claim 1, wherein the real-time visual communication session is a video conference; and
    wherein image data comprises one or more of a still image, a video, a document, and a visual presentation.

20. A computer-readable storage medium comprising instructions for causing a programmable processor to perform operations comprising:
    determining a participation rating for each of a plurality of participants in a real-time visual communication session, wherein the participation rating is based on one or more conversation properties related to the real-time visual communication session and relevant to a desirability for displaying image data associated with a participant for each of the plurality of participants, wherein the participation ratings are associated with a user and wherein the participation rating for each particular participant is determined independently of (i) other users' participation ratings for the particular participant, and (ii) a manual input of the user during the real-time visual communication session;

selecting two or more participants based on the participation rating of each of the two or more participants; and displaying image data associated with the two or more selected participants on a display device of a computing device associated with the user.

21. A computing device, comprising:
one or more processors;
a network interface to connect to a real-time visual communication session having a plurality of participants;
an output device that displays image data; and
a computer-readable storage medium comprising instructions for causing the one or more processors to perform operations, the operations comprising:
  determining a participation rating for each of the plurality of participants in the real-time visual communication session, wherein the participation rating is based on one or more conversation properties related to the real-time visual communication session and relevant to a desirability for displaying image data associated with a participant for each of the plurality of participants, wherein the participation ratings are associated with a user and wherein the participation rating for each particular participant is determined independently of (i) other users' participation ratings for the particular participant, and (ii) a manual input of the user during the real-time visual communication session,
  selecting two or more participants based on the participation rating of each of the two or more participants, and
  displaying image data associated with the two or more selected participants on the output device.

22. A method, comprising:
determining, at a computing device that includes one or more processors and that is associated with a user, a participation rating for each of a plurality of participants in a real-time visual communication session, wherein the participation rating is based on one or more conversation properties related to the real-time visual communication session and relevant to a desirability for displaying image data associated with a participant for each of the plurality of participants, and wherein the participation rating for each particular participant is determined independently of (i) other users' participation ratings for the particular participant, and (ii) a manual input of the user during the real-time visual communication session;

selecting, at the computing device, one or more participants from the plurality of participants based on the participation rating of each of the one or more participants; and providing, for display, image data associated with the one or more selected participants on a display device of the computing device.

23. The method of claim 1, wherein determining the participation rating for each of the plurality of participants in the real-time visual communication session based on one or more conversation properties includes determining the participation rating for each particular participant of the plurality of participants in the real-time visual communication session based on input from the user to block or view the particular participant during a previous real-time visual communication session.

24. The computer-readable storage medium of claim 20, wherein determining the participation rating for each of the plurality of participants in the real-time visual communication session based on one or more conversation properties includes determining the participation rating for each particular participant of the plurality of participants in the real-time visual communication session based on input from the user to block or view the particular participant during a previous real-time visual communication session.

25. The computing device of claim 21, wherein determining the participation rating for each of the plurality of participants in the real-time visual communication session based on one or more conversation properties includes determining the participation rating for each particular participant of the plurality of participants in the real-time visual communication session based on input from the user to block or view the particular participant during a previous real-time visual communication session.

26. The method of claim 22, wherein determining the participation rating for each of the plurality of participants in the real-time visual communication session based on one or more conversation properties includes determining the participation rating for each particular participant of the plurality of participants in the real-time visual communication session based on input from the user to block or view the particular participant during a previous real-time visual communication session.

* * * * *